Jan. 4, 1955 A. J. HANSSEN 2,698,544
SHAFT SEALING MEANS
Filed April 17, 1952 2 Sheets-Sheet 1
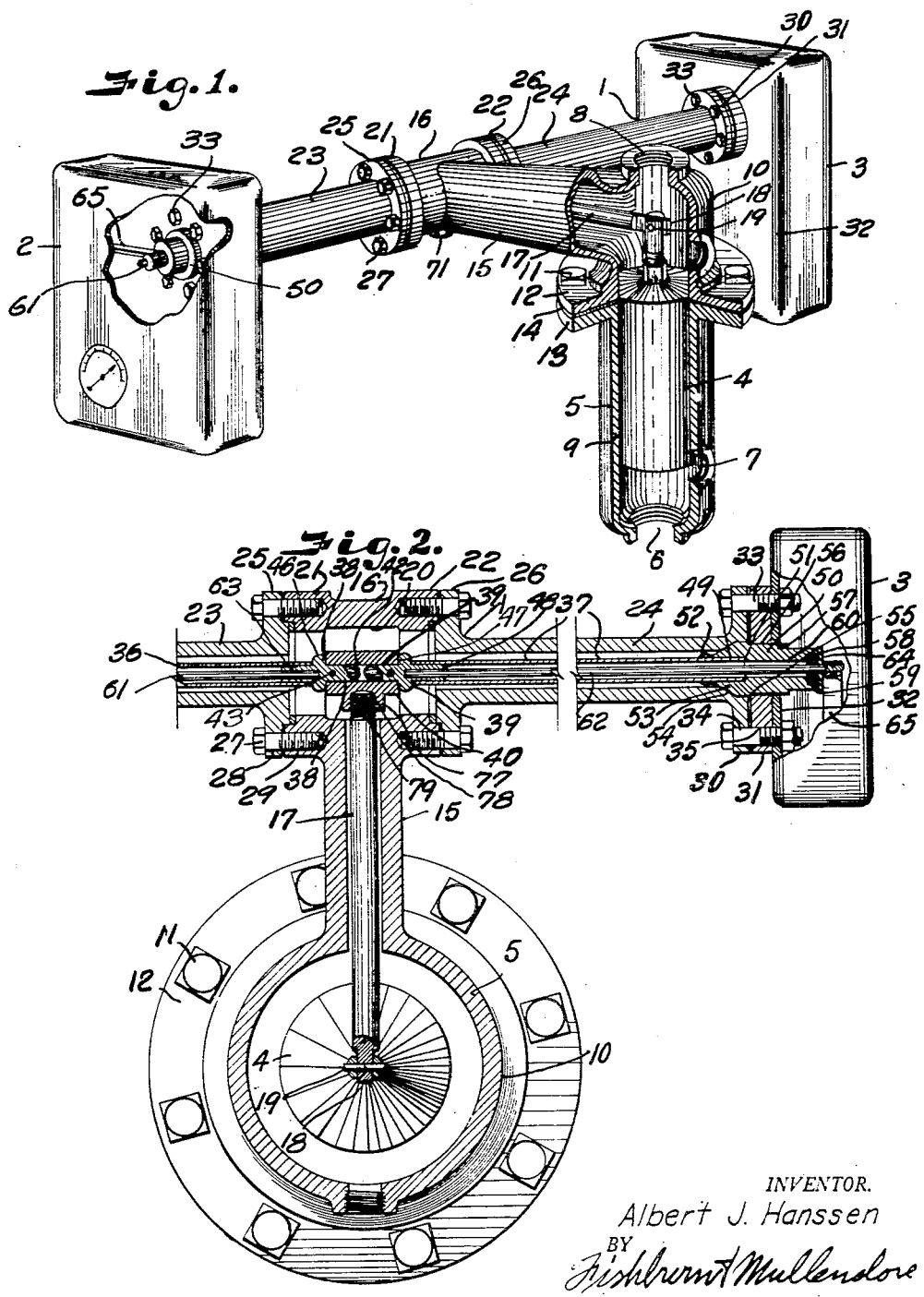
INVENTOR.
Albert J. Hanssen
BY
Fishburn t Mullendore
ATTORNEYS Jan. 4, 1955 A. J. HANSSEN 2,698,544
SHAFT SEALING MEANS
Filed April 17, 1952 2 Sheets-Sheet 2
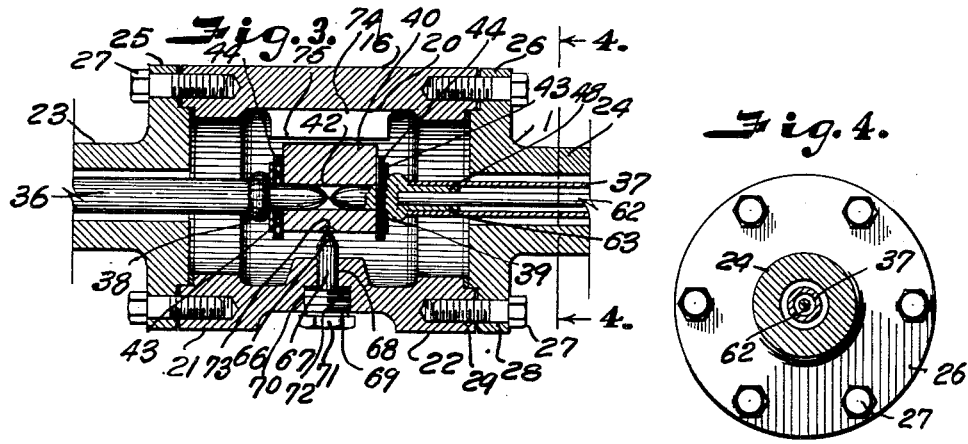
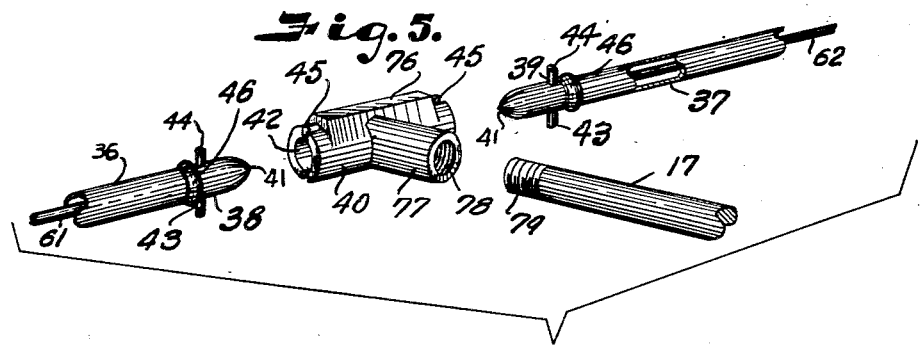
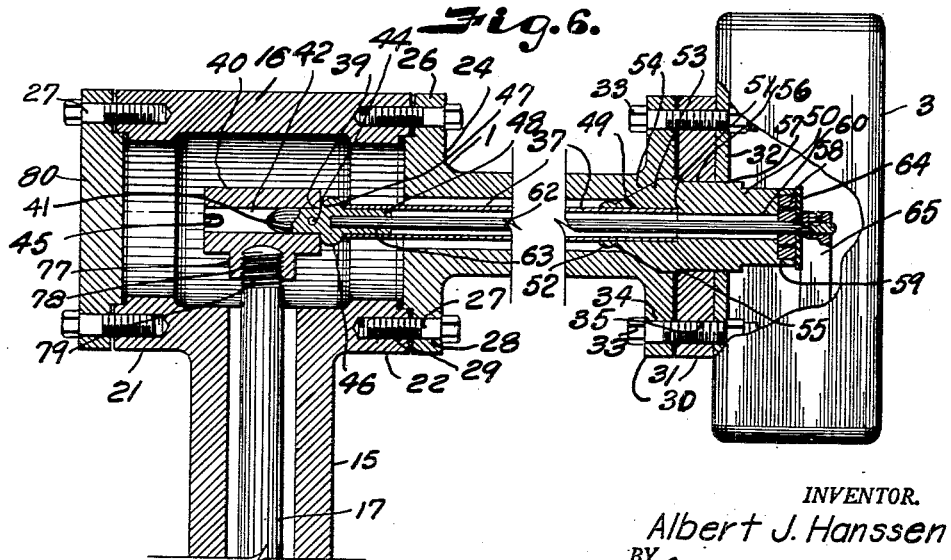
INVENTOR.
Albert J. Hanssen
ATTORNEYS

United States Patent Office 2,698,544
Patented Jan. 4, 1955

2,698,544

SHAFT SEALING MEANS

Albert J. Haussen, Tulsa, Okla., assignor to Black, Sivalls & Bryson, Inc., Kansas City, Mo., a corporation of Delaware Application April 17, 1952, Serial No. 282,913

6 Claims. (Cl. 74—18)

This invention relates to liquid level controllers of the type wherein the weight and/or displacement of a float actuates a controller unit through the medium of a torque tube assembly so as to eliminate the necessity of packing glands, stuffing boxes and the like which are ordinarily employed in liquid level control mechanisms.

The torque tube in this type of device has one end fixed to an anchor block and its opposite end fixed to a float arm which operates a rod extending through the axis of the torque tube for operating the control unit. The float end of the torque tube and rod is usually supported in an outboard bearing which cooperates with the anchor block in maintaining axial alignment of the torque tube and rod, and such supports are not always satisfactory.

The principal object of the present invention is to provide for support of the float arm and the torque tube by means of a cone-type pivot point bearing so as to eliminate any possibility of sticking and freezing encountered in the usual outboard bearings.

It is also an object of the invention to provide a self-aligning support which permits self-alignment of the torque tube and actuating rod relatively to the housings in which they are enclosed and thus eliminate possibility of binding or non-uniformity of action of the level control unit.

A further object of the invention is to provide a bearing support which is adapted for ready removal externally of the enclosing housing for inspection and replacement.

A further object of the invention is to provide a liquid level controller and torque tube housing that has symmetrical ends to permit mounting of the torsion tube and rod in either direction so that the position control unit may be reversed, for example from right to left hand.

A further object of the invention is to provide a liquid level controller adapted to operate a plurality of control units through a single float mechanism.

In accomplishing these and other objects of the invention hereinafter pointed out, I have provided improved structure, the preferred forms of which are illustrated in the accompanying drawings wherein:

Fig. 1 is a perspective view of a liquid level controller equipped with a pair of control units such as pilot valves, switches or the like and showing parts of the float housings and control unit broken away to better illustrate the interiors thereof.

Fig. 2 is a horizontal section through the liquid level controller.

Fig. 3 is an enlarged fragmentary section through the cone pivot housing particularly illustrating the cone pivot and showing interconnection of a plurality of torque tubes and rods.

Fig. 4 is a cross section on the line 4—4 of Fig. 3.

Fig. 5 is a perspective view of the torque tube coupling, the end portions of the torque tube and rod members that are connected therewith, as well as a portion of the float actuated arm, the parts being shown in disassembled spaced relation.

Fig. 6 is a section similar to Fig. 2 but showing a liquid level controller which includes a single torque tube, actuating rod and control unit.

Referring more in detail to the drawings:

1 designates a liquid level controller for actuating dual control units 2 and 3 which may be conventional pilot valves, electric switches or other control devices to be actuated responsive to a liquid level under control of a float 4 (Figs. 1 and 2). The float 4 is reciprocable within a cage or housing 5 which may be connected in any suitable manner with a receptacle or container (not shown) wherein it is desired to control a level or specific gravity of a liquid. For example, the liquid may rise through a duct (not shown) that is threadedly connected with an opening 6 of the cage 5, and pressure is equalized through connections 7 and 8 whereby the float 4 is under complete control of the liquid.

In the form illustrated, the float cage consists of a body part 9 and a cap-like housing 10 which are connected by bolts 11 extending through flanges 12 and 13 and a suitable gasket 14 as best shown in Fig. 1. The cap-like housing 10 is provided with a laterally extending hollow arm 15 that projects therefrom and terminates in a transversely arranged head or bearing support housing 16. The arm 15 accommodates a float arm 17 that is pivotally supported in the transverse housing 16 and which has a free outer end 18 that connects with the float 4 through a pivotal connection 19.

The housing portion 16 of the float arm has a transverse cylindrical bore 20, and the ends are provided with symmetrically arranged circumferential flanges 21 and 22 to which are connected torque tube housings 23 and 24 having flanges 25 and 26 that are fixed to the flanges 21 and 22 by fastening devices such as cap screws 27, the cap screws extending through openings 28 in the flanges of the tubular housings 23 and 24 and into threaded sockets 29 that are provided in the ends of the housing portion 16. The opposite ends of the tubular housings 23 and 24 also have circumferential flanges 30 which are adapted to be connected with complementary flanges 31 on the control units 2 and 3 which may have pilot valve casings 32 of any type since they specifically form no part of the present invention, the casings 32 being secured to the tubular housings 23 and 24 by fastening devices such as bolts or the like 33 extending through registering openings 34 and 35 in the respective flanges 30 and 31 as shown in Fig. 2.

Torque tubes 36 and 37 extend coaxially within the tubular housings 23 and 24 and have adapters 38 and 39 connected with a coupling member 40 to which the float arm 17 is secured. The adapters 38 and 39 include pintles 41 that are received in a transverse bore 42 of the coupling member 40 and connect with the member 40 by means of key pins 43 having projecting ends 44 engaged with diametrically opposed notches 45 in the respective ends of the coupling member. The adapters also have annular flange portions 46 that provide shoulders 47 to abut against the ends of the coupling member 40. Projecting from the opposite ends of the adapters are pintles 48 over which the ends of the torque tubes are pressed and securely connected therewith so that when the coupling member is actuated by movement of the float, the torque tubes turn with the coupling member.

The outer ends of the torque tubes fit into longitudinal bores 49 in anchor blocks 50. The tubes abut against internal shoulders 51 and are secured to the blocks by soldering or welding as indicated at 52 so as to provide a rigid and sealed connection between the outer ends of the torque tubes and the anchor blocks.

The anchor blocks are preferably provided with substantially conical ends 53 that fit into conical seats 54 formed in the ends of the tubular housings 23 and 24. The anchor blocks are of generally cylindrical form and have annular stop shoulders 55 that engage against the flanges 31 so that when the bolts 33 are tightened, the cone-shaped ends 53 of the anchor blocks are securely wedged within the conical seats 54 to firmly anchor the outer ends of the torque tubes. The anchor blocks extend within the casings 32 through openings 56 and 57 and the inner ends carry anti-friction bearings 58 that are mounted within counterbores 59 of axial bores 60 which register with the inner diameter of the torque tubes as best shown in Fig. 2. A leak-tight joint is thus provided between the float cage and the casings 32, and the torque tubes are firmly anchored.

It is also obvious that the inner ends of the torque tubes are sealed with respect to the pintles 48 so that the torque tubes form flexible seals between the float cage and the casings 32 thereby eliminating pack glands, stuffing boxes, and like seals that are subject to leakage.

Extending coaxially through the torque tubes are rods 61 and 62 having their inner ends fixed within bores 63 of the pintles 48. The outer ends of the rods extend through the anti-friction bearings 58, through bearing retaining disks 64, and mount the operating element 65 of the control units as the case may be.

In order to support the coupling member 40 in axial alignment with the torque tubes and actuating rods and to prevent binding in case of slight misalignment of the parts, the coupling member is mounted on a pivot point bearing 66 as best shown in Fig. 3. The pivot point 66 is carried on a pintle 67 that extends inwardly into the housing portion 16 through an opening 68 formed in an internal boss on the underside of the housing portion 16 and has an externally threaded head 69 engaged in an internally threaded socket 70 formed within the housing portion 16 as shown in Fig. 3. The external side of the threaded head 69 has a polygonal shaped portion 71 which may be engaged by a suitable wrench or the like to thread the support into and out of position.

A leak-tight seal is provided by means of a gasket ring 72 that is positioned between the head 69 and the bottom of the socket 70. The cone point, thus supported, engages within a dimple or slight depression 73 as shown in Fig. 3 whereby the coupling member is supported and adapted to rock or turn in any direction to provide freedom of movement of the torque tubes and rods under actuation of the float valve and to eliminate possibility of sticking or binding, tending to interfere with accuracy in operation of the moving parts.

The coupling member is retained on the cone point support by means of a rib or pad 74 that extends longitudinally within the housing portion 16 and which has a lower edge 75 extending along the coupling member 40 on the side thereof opposite the point bearing as shown in Fig. 3, ample contact surface being provided by an elongated boss 76 forming an integral part of the coupling member. The float rod 17 may be connected with the coupling member in any suitable manner, for example, the coupling member may be provided with an integral shank portion 77 having an internally threaded socket 78 into which a threaded end 79 of the float arm is engaged.

In the form of the invention shown in Fig. 6, only a single control unit or pilot valve or switch is used and, therefore, the end of the housing portion 16 is closed by a removable plate 80 that is secured by the fastening devices 27. Otherwise, the construction and point support mounting of the coupling sleeve is the same as in the form of the device previously described. With this arrangement, the liquid level controller may be converted from a right to a left hand device merely by disconnecting the torque tube housing and plate 80, after which the tubular housing is attached to the other side of the housing portion 16, and the plate 80 is attached to the opposite side by reinserting the cap screws.

It is thus obvious that the change may be quickly made in the field, and it is not necessary to order a controller having a right or a left mounting of the control unit.

It is obvious that upon removal of the tubular housings, the pintles for the torque rods are readily withdrawn from the bore of the coupling member 40 and when the tubular housings are to be reconnected, the pintles 38 readily fit within the bore 42 of the coupling member with the ends of the pins 44 engaging in the notches 45.

In case a single device such as shown in Fig. 6 is in use and it is desired to provide that device with an additional control unit, for example to operate a signal or other mechanism or to provide a dual unit to assure operation of some mechanism that is controlled by a liquid, the plate 80 may be removed and replaced with an additional unit including the tubular housing 23, torque tube, actuating rod and adapter. When the additional unit is mounted, the pintle thereof slips readily within the open end of the coupling member with the pins of the adapter engaging within the notches. Then when the fastening devices are applied to draw the flanges tightly together, the structure is provided as shown in Figs. 1 and 2.

In operation, any variation of the liquid level is transmitted to the float cage as through one of the connections, for example 6 or 7, and thus the float moves responsive to such variations. The float 4 may or may not be buoyant in the liquid by itself depending upon the nature of the installation. Preferably, the float operates by variations in the effective weight of the float in the liquid, caused by variations in the submergence of the float in the liquid. The torque tubes 36 and 37 normally support the float in operative position, thereby increasing the equivalent buoyancy of the float to such an extent that a variation in partial submergence gives the necessary change in torque to upset static equilibrium, thereby causing the torsion tube to rotate to a position of exerted torque for final equilibrium.

A rise in the liquid level will give an increase in buoyancy, thereby causing the torque tube or tubes to rotate to such a position that the equilibrium of the exerted torque, the weight of the float, and the displaced weight of the liquid are in balance. The slightest movement of the float and float arm is transmitted directly to the control unit or units, pilot valves which may be electric switches or other devices as the case may be by turning of the actuating rods 61 and 62. During movement, the torque parts are freely supported on the point bearing 66 so that any movement in the float responsive to change in liquid level is easily and freely transmitted to the arms 65 of the control units.

It is obvious that with the cone point 66, sticking and freezing are eliminated, and there is no climbing tendency of the coupling member from the cone point since the possibility of bind or non-conformity of action is entirely eliminated by the single point support.

It is also obvious that the cone point is readily removed for inspection and replacement without disassembling any of the housing parts. The symmetrical design for the housing portion 16 also permits ready change of a single control unit to a right or left mounting or to actuation of double control units.

What I claim and desire to secure by Letters Patent is:

1. In a device for transmitting motion of a movable element within a housing to a movable element of a control unit exteriorly of the housing wherein the housing includes a tubular arm portion having a transverse tubular head portion symmetrical on opposite sides of the arm portion, said symmetrical sides of the head portion having openings, a torque tube housing having one end adapted for connection with one or the other of said symmetrical sides of the transverse head portion, a closure plate for the opening in the other of said symmetrical sides, said control unit being connected with the other end of the tubular housing, a torque tube having one end in fixed relation with the tubular housing and the other end extending through the opening of the symmetrical side to which the tubular housing is connected, a coupling member having connection with the movable element, a cone point bearing supporting the coupling member in said transverse head portion, and a rod coaxial within the torque tube and having one end connected with the movable element of the control unit and the other removably connected with the coupling member.

2. In a device for transmitting motion of a movable element within a housing to a movable element of a control unit exteriorly of the housing wherein the housing includes a tubular arm portion having a transverse tubular head portion provided with symmetrical ends on opposite sides of the arm portion, said ends having openings, a torque tube housing having one end adapted for connection with one or the other of said symmetrical ends, a closure plate for the opening in the other of said symmetrical ends, said control unit being connected with the other end of the tubular housing, a torque tube having one end in fixed relation with the tubular housing and the other end extending through the opening of the symmetrical end to which the tubular housing is connected, a coupling member having connection with the movable element, bearing means supporting the coupling member in said transverse housing portion, and a rod coaxial with the torque tube and having one end connected with the movable element of the control unit and the other removably connected with the coupling member, said bearing means comprising a pin element projecting into the transverse housing portion intermediate said symmetrical ends and having a cone point engaging a dimple in said coupling member.

3. In a device for transmitting motion of a movable element within a housing to a movable element of a control unit exteriorly of the housing wherein the housing includes a tubular arm portion having a transverse tubular head portion provided with symmetrical ends on opposite sides of the arm portion, said ends having openings, a torque tube housing having one end adapted for connection with one or the other of said symmetrical ends of the transverse head portion, a closure plate for the opening in the other of said symmetrical ends, said control unit being connected with the other end of the tubular housing, a torque tube having one end in fixed relation with the tubular housing and the other end extending through the opening of the symmetrical end to which the tubular housing is connected, a coupling member having connection with the movable element, bearing means supporting the coupling member in said transverse housing portion, and a rod coaxial with the torque tube and having one end connected with the movable element of the control unit and the other removably connected with the coupling member, said bearing means comprising a pin element projecting into the transverse housing portion intermediate said symmetrical ends and having a cone point engaging a dimple in said coupling member, said pin element having an externally threaded portion engaged in a threaded opening in the transverse housing portion.

4. In a device for transmitting motion of a movable element within a housing to a movable element of a control unit exteriorly of the housing wherein the housing includes a tubular arm portion having a transverse tubular head portion provided with symmetrical ends on opposite sides of the arm portion, said ends having openings, a torque tube housing having one end adapted for connection with one or the other of said symmetrical ends of the transverse head portion, a closure plate for the opening in the other of said symmetrical ends, said control unit being connected with the other end of the tubular housing, a torque tube having one end in fixed relation with the tubular housing and the other end extending through the opening of the symmetrical end to which the tubular housing is connected, a coupling member having connection with the movable element, bearing means supporting the coupling member in said transverse housing portion, and a rod coaxial with the torque tube and having one end connected with the movable element of the control unit, an adapter carried by the said other end of the torque tube and having a pintle portion connected with the other end of the rod, and a transverse pin carried by the adapter, said coupling member having a notch receiving the pin to connect the rod with the coupling member.

5. In a device for transmitting motion of a movable element within a housing to movable elements of a plurality of control units exteriorly of the housing wherein the housing includes an arm portion having a transverse tubular head portion provided with symmetrical ends on opposite sides of the arm portion, said ends having openings, torque tube housings having ends in connection with said symmetrical ends of the transverse head portion, said control unit being connected with the other ends of the tubular housings, torque tubes having ends in fixed relation with the tubular housings and the other ends extending through said openings, a coupling member having connection with the movable element, bearing means supporting the coupling member in said transverse housing portion, rods coaxial within the torque tubes and having ends connected with the movable elements of the control units, and adapters fixed to the rods and torque tubes and having pintle portions provided with transverse pins, said coupling member having an axial bore in which the pintle portions are received and having notches receiving the transverse pins to connect the rods with the coupling member.

6. In a device for transmitting motion of a movable element within a housing to movable elements of a plurality of control units exteriorly of the housing wherein the housing includes a tubular arm portion having a transverse head portion, torque tube housings having ends connected with the transverse head portion on opposite sides of the arm portion, torque tubes having ends in fixed relation with the tubular housings and other ends extending into the transverse head portion, a coupling member having connection with the movable element, cone point bearing means supporting the coupling member in said transverse head portion, and rods within the torque tubes and connecting the movable elements of the control units with said coupling member.

References Cited in the file of this patent

UNITED STATES PATENTS

| | | |
|---|---|---|
| 769,092 | Kollar | Aug. 30, 1904 |
| 2,248,322 | Annin | July 8, 1941 |
| 2,263,771 | Griffey | Nov. 25, 1941 |
| 2,376,473 | Brockett | May 22, 1945 |
| 2,542,769 | Griffey | Feb. 20, 1951 |
| 2,599,159 | Breedlove | June 3, 1952 |